Figure 7:
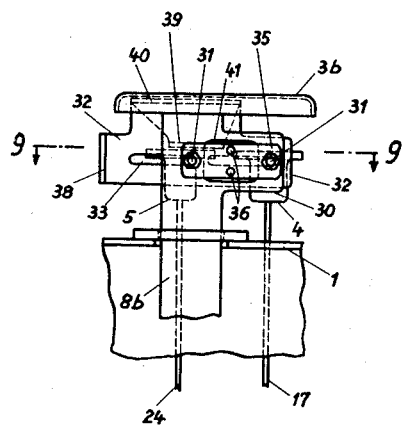

Nov. 16, 1937.  J. GEBHARDT  2,099,060
CALCULATING MACHINE
Filed July 17, 1934  2 Sheets-Sheet 1
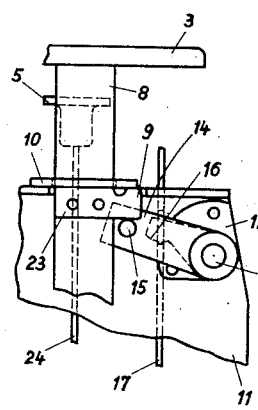
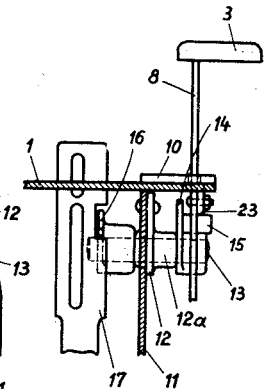
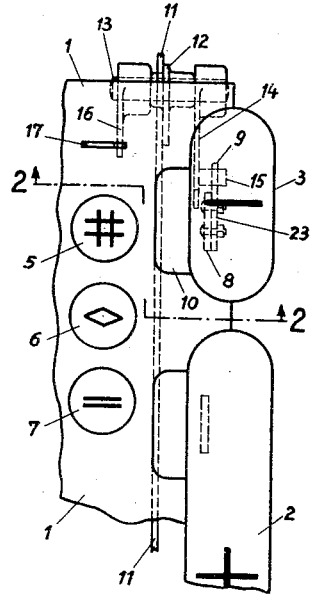
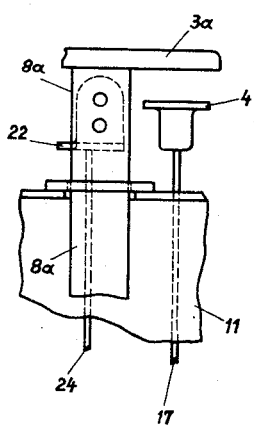
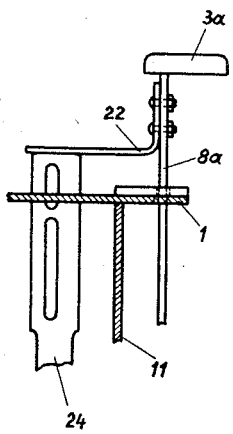
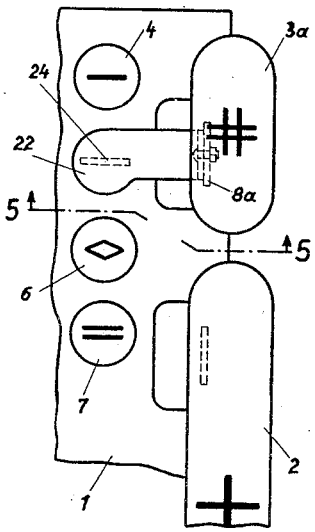
Inventor:
Johannes Gebhardt
By
Attorney Nov. 16, 1937.     J. GEBHARDT     2,099,060
CALCULATING MACHINE
Filed July 17, 1934     2 Sheets-Sheet 2

Inventor:
Johannes Gebhardt
By [signature]
Attorney

Patented Nov. 16, 1937

2,099,060

UNITED STATES PATENT OFFICE 2,099,060

CALCULATING MACHINE

Johannes Gebhardt, Schonau, near Chemnitz, Germany, assignor to Wanderer-Werke vorm. Winklhofer & Jaenicke Akt.-Ges., Schonau-Chemnitz, Germany Application July 17, 1934, Serial No. 735,681
In Germany July 22, 1933

2 Claims. (Cl. 235—62)

This invention relates to calculating machines, particularly adding machines, in which calculating mechanism can be set or conditioned by different controls for various operations, for example, addition, subtraction, non-addition, totaltaking, etc. Machines of this kind are known having a motor bar with large handling head for coupling the motor drive to the calculating mechanism to perform addition. The large handling head, generally located at a prominent part of the keyboard, enables the motor bar to be manipulated easily and without particular care, whereby adding operations can be performed very rapidly. The known machines also have a second motor bar with large handling head also operative to couple the motor drive to the calculating mechanism, but with simultaneous setting of the latter for subtraction. This second large headed motor bar is likewise easy to manipulate without special care, whereby subtraction operations can be effected at high speed by means of a single manipulative means. To perform the other operations these machines have keys or the like with small or normal size heads, the manipulation of which requires greater care and precision and cannot be effected with the same rapidity as the aforesaid motor bars with large handling heads provided for addition and subtraction. If it were desired to provide all the controls with large handling heads like those of the motor bars, the advantages of prominence and quick operation of the motor bars for addition and subtraction would be at least partly lost because it would be necessary to select the desired control from among a number of similar controls. Also, the keyboard would have to be larger and the cost of the machine would be increased.

An object of the present invention is to improve machines of the aforesaid kind by simplifying the operation of the machine in performing various selective operations.

Another object of the invention is to provide a machine which without far-reaching constructional alteration can be so set up or conditioned that either additions and subtractions, or additions and non-additions, or additions and any other desired operations, can be performed by manipulating only the two large headed motor bars.

Another object of the invention is to provide means for automatically indicating the operation for which the machine is at any time set or conditioned.

Figure 8:
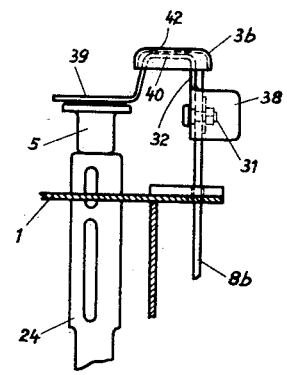
Figure 9:
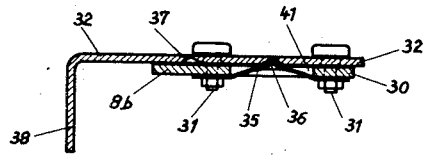
Figure 10:
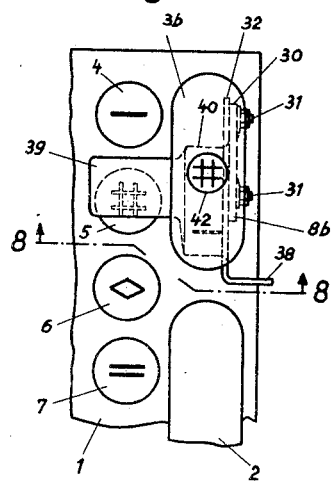
Figure 11:
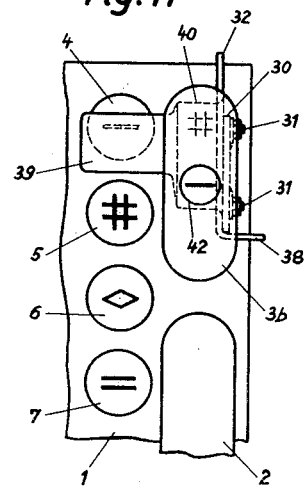

Other objects and features of the invention will become apparent from the following detailed description of embodiments thereof illustrated in the drawings, and are claimed in the claims appended hereto. In the drawings:

Figure 1 shows the connection of an upper motor bar with the subtraction key in a left hand side elevation, Fig. 2 is a section through the bank of control keys taken on line 2—2 of Fig. 3, Fig. 3 is a top plan view of the right hand side of the control key bank, with the upper motor bar connected with the mechanism for conditioning the machine for subtraction, Fig. 4 is a side elevation of the upper motor bar connected with the non-add key, Fig. 5 is a section through the bank of control keys taken on line 5—5 of Fig. 6, Fig. 6 is a top plan view of a part of the control key bank, with the upper motor bar connected with the mechanism to condition the machine for non-adding operations, Fig. 7 is a side elevation of another embodiment of the invention, Fig. 8 shows a section taken on line 8—8 of Fig. 10, Fig. 9 shows a section taken on line 9—9 in Fig. 7, Fig. 10 is a top plan view showing part of the control key bank according to Figs. 7, 8, and 9, with the upper motor bar connected with the mechanism conditioning the machine for non-adding operations, Fig. 11 is a top plan view showing part of the control key bank according to Figs. 7, 8 and 9, with the upper motor bar connected with the mechanism conditioning the machine for subtracting operations.

The hereafter described mechanisms may be used in a calculating machine with full keyboard having nine rows of nine keys each and calculating mechanism for performing addition and subtraction, as described in German Patent No. 467,756.

Referring first to Figs. 1–6, at the side of the keyboard there is arranged a motor bar 2 with large handling head, depression of which switches in the motor and couples it to the calculating mechanism to perform an addition. Additions can thus be rapidly and reliably performed by manipulating a single easily operable control. Above the motor bar 2, a second motor bar 3 is shown at the side of the keyboard, Fig. 3, said bar also having a large handling head. Depression of the motor bar 2 serves to couple the motor to the calculating mechanism and at the same time to condition the latter for subtraction. The other controls, viz. a non-addition key 5, a total key 6, and a sub-total key 7, are arranged beside the two motor bars at the side of the keyboard, these keys 5, 6, 7, having the usual small heads. Depression of any of the keys 5, 6, 7 conditions the calculating mechanism in well known manner for the corresponding function, and for the purpose of the present invention it is immaterial whether or not depression of the keys 5, 6, 7 also switches in the drive motor to carry out the operation for which the mechanism is conditioned. As the keys 5–7 have only small heads they have to be manipulated relatively slowly and carefully to avoid mistakes.

It is the purpose of the mechanisms herein described to enable the functions controlled by the small headed keys 5–7 to be performed with the same facility and rapidity as addition and subtraction can be performed by manipulation of the large headed motor bars.

It is particularly desirable to have available such a manipulation when the machine has to perform similar frequently repeated functions. While usually addition and subtraction are the most frequent operations, occasions may arise in which, for example, addition and non-addition occur frequently and subtraction infrequently. By non-addition is meant the setting up and printing of a number, for example an account number, which is not to enter into the calculation.

The motor bar 3 in Fig. 3 is supported by a key stem 8, the lower end of which is adapted in known manner to switch in the drive motor (not shown) for operating the calculating mechanism. A plate 23 disengageably connected with the key stem 8 carries a lug 9, which in its normal position is pressed against a plate 10 of the keyboard 1 by a spring (not shown). Riveted on a side wall 11 of the machine is a bracket 12 carrying a boss 12a, in which a rod 13 is pivoted. One end of the rod 13 extends outside of the wall 11 and is connected to a lever 14, which carries on its end a pin 15. The pin 15 is movable by the lug 9 when this lug is pressed down by the motor bar 3. This movement of the pin 15 is attended by a downward movement of the lever 14 and a rotation of the rod 13. The rod 13 drives a lever 16 connected with its inner end and engaging a slot in the key stem 17. This stem 17 may be a subtraction control in well known manner and its depression also causes the motor drive to be switched in and coupled to the calculating mechanism. It may be provided with a head 4 as shown in Fig. 4. By operating the upper motor bar 3 it will be seen that the switching in of the driving motor and the operation of the calculating mechanism for a subtraction are effected by means of the parts 3, 8, 23, 15, 14, 13, 16, 17.

If the connection of the upper motor bar 3 with the subtraction control 17 is never to be disengaged, the head of the subtraction key can be removed from the key stem 17, as shown in Figs. 1–3. The control 17 being driven by the large headed motor bar 3, it can be operated with maximum ease and rapidity.

Figs. 4, 5 and 6 show the upper motor bar 3a connected with the control to condition the calculating mechanism for non-adding operations. On the stem 8a of the upper motor bar 3a an angle piece 22 is disengageably connected, while the head 5 of the key stem 24 for the non-adding mechanism has been removed. The horizontal portion of an angle piece 22 is situated above the key stem 24 and is either connected with this key stem 24 or held adjacent to it, for instance by a spring. When the parts are in this condition the upper motor bar 3a is pressed down, the control for conditioning the calculating mechanism for a non-adding operation being actuated by the angle piece 22, together with the switching in of the drive motor and its coupling to said mechanism. In this case the non-adding sign # (Fig. 6) is marked on the motor bar 3a. If the machine is provided with the mechanism according to Figs. 4–6, the intermediate parts 12—16 according to Figs. 1–3 are either removed or set in an inoperative condition.

It is of great advantage to have the machine thus conditioned for maximum ease and rapidity of operation in repeated addition and non-addition, under conditions in which amounts have to be added and corresponding numbers printed designating account numbers or other indicia which do not enter the calculation, while subtraction is infrequently required. The known machines of the similar general type cannot be so conveniently operated under such conditions since the frequently repeated non-additions have to be effected by manipulating a not prominent, small headed key.

It will also be understood that by merely shifting a few intermediate parts and key heads the machine can be conditioned for repeated performance of one or the other function in a very simple way. The holes, bearings, levers, pins, and so on can be provided without any appreciable increase in costs, even in an existing machine. Such machines can be conditioned at any time, even in the office of the buyer, after the machines have been already used, for any particular functions desired. Of course, it is possible to build in all intermediate parts for both the arrangements illustrated when manufacturing the machines. In this case it is only necessary later on to connect the corresponding parts either of the subtracting mechanism or of the non-adding mechanism with the motor bar. The parts not used then move idly at every operation of the machine or are taken off shortly before the operative conditioning connections are made.

Figs. 7–11 show another embodiment of the invention. On the key stem 8b of the upper motor bar 3b and an enlargement 30 of this stem are connected two screws 31 passing through slots 33 of a slide plate 32. By means of the screws 31 a leaf spring 35 (Fig. 9) is also connected to the key stem 8b, 30. This spring 35 is provided with two projections 36 by which it is held in two deepened portions 37 of the slide plate 32 to secure this selectively in one of two positions. To accommodate the leaf spring 35, the key stem 8b is provided with a cut-out portion 41. The slide plate 32 is provided with a right angle portion 38 as a handle to displace it from one to the other position. The slide plate 32 has an upper part 40 which enters the interior of the head of the upper motor bar 3b (Fig. 8). The plate 32 also has a horizontal member 39 which extends over the keys 4 and 5 of the keyboard.

The slide plate 32, according to whether it is in one or the other location determined by the slots 33 and the projections 36, causes its horizontal member 39 to overlie one of certain control keys, for instance the subtraction key 4 or the non-adding key 5. When the upper motor bar 3b is depressed that one of the keys 4 or 5, which underlies the horizontal member 39, is carried downwards with the motor bar, which therefore operates the machine selectively either for a subtracting or a non-adding operation.

The upper horizontal portion 40 of the slide plate 32 carries preferably the corresponding signs, for instance the subtraction sign — and the non-adding sign # (Figs. 10 and 11). The signs are so arranged that the minus-sign is visible through a window 42 in the upper motor bar 3b, when the slide-plate 32 is in its position according to Fig. 11. This minus-sign indicates that the upper motor bar 3b is set to control the subtracting mechanism. The non-adding key 5 can be operated then in the usual way. Fig. 10 shows the upper motor bar 3b clutched with the non-adding mechanism in the same way. According to this Fig. 10 the non-adding key 5 is covered by the horizontal member 39 of the slide plate 32, and the non-adding sign, which is shifted with the member 39, becomes visible in the window 42 of the upper motor bar 3b, while the subtraction key 4 is to be operated in the usual way, it causing, through the stem 17, the drive motor to operate the calculating mechanism for subtraction.

The clutching of the motor bar with the two mechanisms: Subtraction and non-addition shown in the drawings are preferred embodiments of the machine, but it will be understood that variations may be made without departing from the spirit and scope of the invention. For instance, it is possible to couple other keys (total key, sub-total key, and others) in the same way with the motor bar. For this purpose it is not necessary to use such slide plates as are shown in the drawings; also other intermediate parts can be used as coupling members between the motor bar and the different controls to perform the different functions of the machine, especially when the different keys which are to be coupled are not positioned closely together on the keyboard. Furthermore, the invention is not limited to only the coupling of two different controls with the motor bar, but it is also within the scope of the invention to couple more than two operating mechanisms with one motor bar.

I claim as my invention:

1. A motor driven calculating machine comprising calculating mechanism, a motor bar with a large handling head controlling the coupling of the motor drive with the calculating mechanism, control means normally operable by normal size handling heads serving to condition the calculating mechanism for operations other than addition, and an adjustable transmission member capable of being made operative and inoperative for selectively connecting said motor bar with at least one of the other control means, said member being slidably mounted on said motor bar, and means for indicating which of said controls is thus connected, said indicating means being shifted along with said transmission member.

2. A machine according to claim 1 in which indicating symbols are marked on a part of the transmission member which is slidable under a view opening in the motor bar.

JOHANNES GEBHARDT.